No. 752,984. PATENTED FEB. 23, 1904.
J. KNUTH & C. READ.
VEHICLE BRAKE.
APPLICATION FILED OCT. 25, 1902.
NO MODEL. 2 SHEETS—SHEET 2.
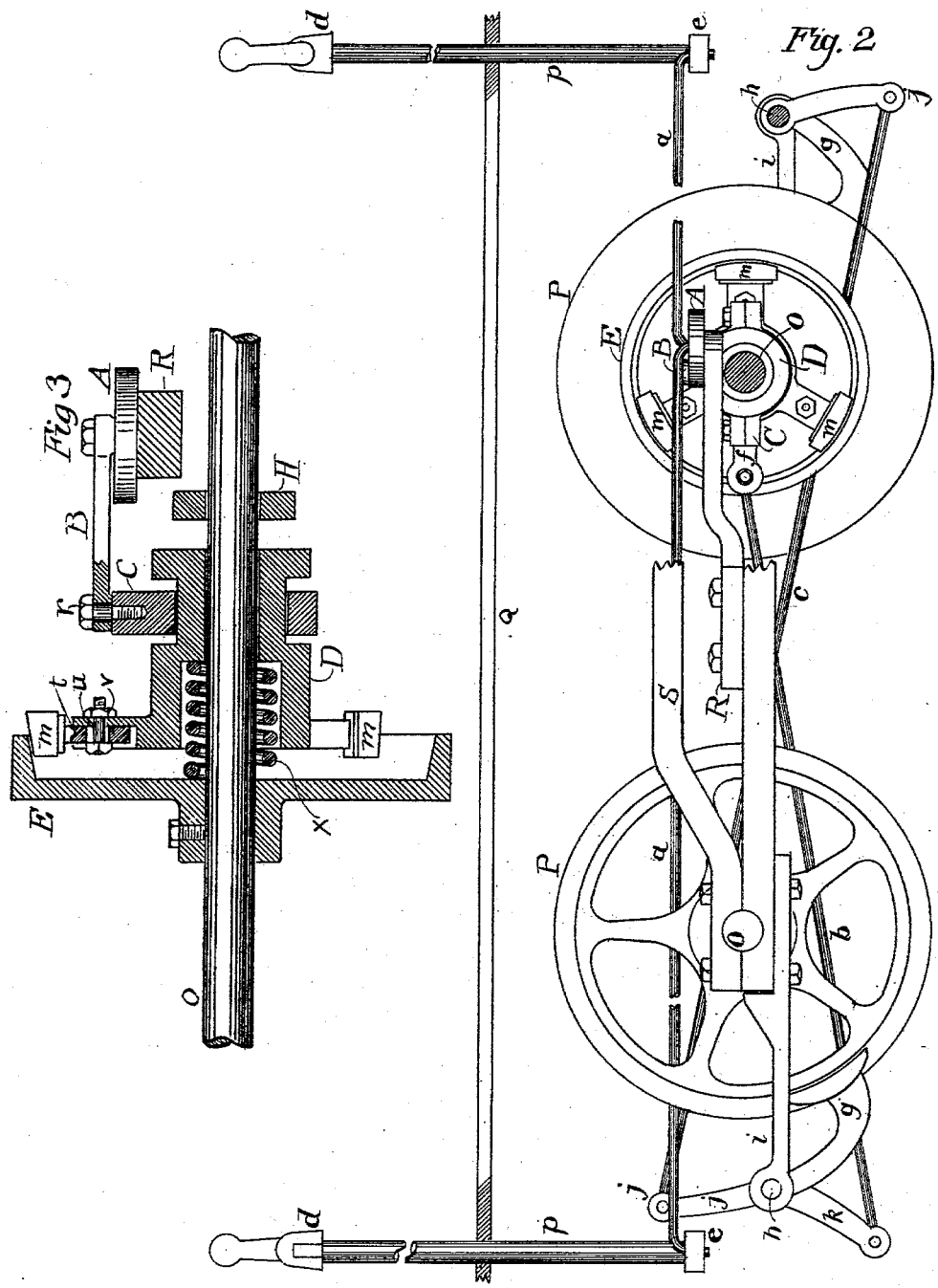

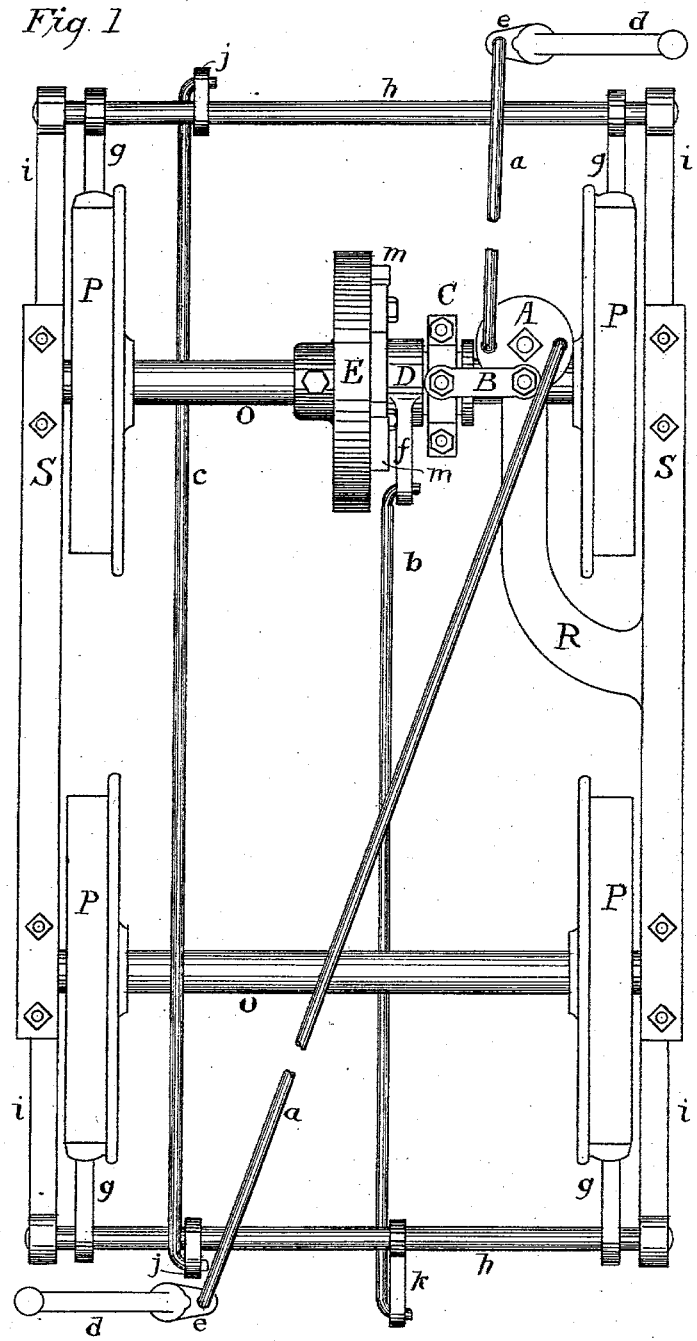

No. 752,984.

Patented February 23, 1904.

UNITED STATES PATENT OFFICE.

JAKE KNUTH AND CHARLES READ, OF OSWEGO, ILLINOIS.

VEHICLE-BRAKE.

SPECIFICATION forming part of Letters Patent No. 752,984, dated February 23, 1904.

Application filed October 25, 1902. Serial No. 128,708. (No model.)

*To all whom it may concern:*

Be it known that we, JAKE KNUTH and CHARLES READ, citizens of the United States, residing at Oswego, in the county of Kendall and State of Illinois, have invented certain new and useful Improvements in Vehicle-Brakes, of which the following is a specification.

The present invention relates to a brake for arresting the momentum of a moving vehicle of any description, but which is more especially adapted for use on street-cars, road-vehicles, and other comparatively light vehicles which are not equipped with air or other power for braking purposes.

More specifically stated, it relates to a brake apparatus of such construction that by the manual application of comparatively little power a friction-wheel which derives its motion from one of the track or ground wheels may be caused to apply the brake with the force necessary for even emergency stops. To this end the brake-rods are connected by suitable devices with the controllable member of a friction-clutch, and this member is so connected with the hand-lever of the brake that the operator may force the controllable clutch member into frictional engagement with the other member (the friction-wheel aforesaid) with sufficient force to exert upon the brake-rods any desired amount of pull, whether much or little.

The object of the invention is to provide an improved brake of this type; and the invention consists in the features of novelty hereinafter described.

We have illustrated the invention in its application to the truck of a street-railway car; but the invention is not limited thereto. On the contrary, it may be applied to vehicles of all descriptions or even to a stationary system having a revoluble shaft which it is desired to control by means of a brake.

In the accompanying drawings, which are made a part of this specification, Figure 1 is a plan view of a truck and of a brake embodying the invention. Fig. 2 is a side elevation with some of the parts in the foreground omitted. Fig. 3 is an enlarged section of the clutch mechanism including the means for controlling it.

The frame of the truck, which may be of any desired construction and portions of which are shown at S, is supported by the axles O of the ground or track wheels P. The brake-beams $h$ are supported by brackets $i$ and in turn carry the hangers $g$ of the brake-shoes. The brake-beams have rigid arms $j$, one projecting upward and the other downward, and these arms are connected by a rod $c$, which crosses the plane common to their centers of oscillation, so that they are compelled to move in opposite directions. One of the brake-beams has a second rigid arm $k$, which projects from it at the side opposite its arm $j$, and this arm $k$ is connected by a rod $b$ with an arm $f$, carried by a sleeve D, so mounted upon one of the axles that it is capable of a limited endwise and also a limited rotary or oscillatory movement thereon. This sleeve D constitutes the base or foundation of the sliding member of a friction-clutch, being the member under the immediate control of the operator. It is provided with a reduced portion surrounded by a two-part collar C, to which is pivotally connected, by means of a stud-bolt $r$, one end of an endwise-movable thrust rod or link B, so that as the link is thrust endwise it will push the collar C against one of the two shoulders resulting from the reduction of the sleeve D, and thereby move the sleeve endwise on the axle O toward a friction-wheel E with the results presently to be described.

The end of the link B which is remote from the collar C is pivoted eccentrically to a part A, hereinafter called a "rocker." This rocker is pivotally supported by a stout bracket R, carried by the frame, and at diametrically opposite points, each ninety degrees removed from the point of attachment of the link B, the ends of pull-rods $a$ are pivotally connected to it. These pull-rods proceed from the rocker in opposite directions and are jointed to arms $e$, carried by the staffs $p$ of the hand-levers $d$. The arms $e$ of the two staffs project in opposite directions, so that by a right-hand revolution of either of the staffs an endwise pull will be exerted on its pull-rod $a$, and by reason of the fact that the pull-rods are connected with the rocker on opposite sides of its center of oscillation whichever of the pull-rods acts upon it the rocker will be moved in the direction which will thrust the link B endwise toward the friction-wheel E. This wheel E is non-rotatively secured to the axle O and has a peripheral flange or rim which flares outward and presents a conical bearing-surface for the friction blocks or shoes $m$ of the sliding member of the clutch. Each of these blocks or shoes has a stem $t$ slidably mounted in a radial bearing provided for it in the face of a radial arm carried by the sleeve D, and the stem is held in place by a bolt $u$ and nut $v$, one of the openings through which the bolt passes being elongated radially for permitting adjustment to compensate for wear.

The end of the sleeve D adjacent to the wheel E is counterbored, and in this counterbore is a coiled spring X, which surrounds the axle and which exerts its pressure in one direction against the wheel E and in the other direction against the sleeve D. By this means the two members of the clutch are held normally out of contact, and in addition to this they are automatically separated immediately upon the removal of the force that caused them to engage.

The clutch member E will partake of the rotary movement of the axle O whichever way the latter may be rotating. It is manifest, therefore, that if the clutch members be forced together the sleeve D will partake of the movement of the clutch member E and will be moved with it a greater or less distance and with a greater or less force, depending upon the amount of friction between the engaging surfaces of the two members. The movement of the sleeve D causes the arm $f$ to move one way or the other from its normal central position, and this in turn exerts an endwise pull upon the rod $b$ and applies the brake.

By reason of the fact that the arm $f$ stands normally in a position which is central with respect to a line drawn from its center of movement to the point of attachment of the rod $b$ to the arm $k$ it makes no difference which way the sleeve D turns. Whichever way it turns the result will be the same—an endwise pull upon the rod $b$ and the consequent application of the brake.

By reason of the fact that the rods $a$ are connected with the rocker A on opposite sides of its center of movement it makes no difference which of them is pulled upon. Furthermore, this opposite connection has the advantage of enabling the use of two pull-rods $a$ and dispensing with the need for a thrust-rod between the rocker and either of the hand-lever staffs.

A brake thus constructed may be operated from either platform of a car and will without special adjustment or setting of any of its parts operate with equal facility, whether the vehicle is moving one way or the other.

What we claim as new, and desire to secure by Letters Patent, is—

1. In a brake, the combination of a pair of beams, hangers carried by the beams, brake-shoes carried by the hangers, a rigid arm projecting upward from one of said beams, a rigid arm projecting downward from the other of said beams, a rod crossing the plane common to the centers of oscillation of the brake-beams and connecting said rigid arms whereby the brake-beams are compelled to oscillate in opposite directions, a second rigid arm projecting from one of said brake-beams at the side thereof opposite its aforesaid rigid arm, a rod connected to the rigid arm last aforesaid and means for exerting a pull upon said rod, substantially as described.

2. In a brake, the combination of a rotary shaft deriving its rotation from a ground wheel, a clutch member rigidly secured to said shaft and having a flange, a coöperating clutch member mounted to slide upon the shaft, said coöperating clutch member having radially-presented friction-blocks adapted to engage the inner surface of said flange, radial stems carrying said friction-blocks, radial bearings in which said stems are radially adjustable, and means for adjusting said stems in said bearings, substantially as described.

3. In a brake, the combination of a rotary shaft deriving its rotation from a ground-wheel, a clutch member having a flange, a coöperating clutch member mounted to slide longitudinally upon the shaft and having radially-presented friction-blocks adapted to engage the inner surface of said flange, radial stems carrying said blocks, radial bearings in which said stems are radially adjustable and bolts for securing said stem in place, the openings through which the bolts pass being elongated radially, substantially as described.

4. In a brake, the combination of a rotary clutch member deriving its rotation from a ground-wheel, a slidable clutch member adapted to coöperate therewith, means for transmitting movement from the slidable clutch member to the brake-shoe and controllable means for operating the slidable clutch member, said controllable means including a rocker, pull-rods connected to said rocker at diametrically opposite points, and a link connected to said rocker at a point between the points of attachment of the pull-rods, substantially as described.

5. In a brake, the combination of a rotary clutch member deriving its rotation from a ground-wheel, a slidable clutch member adapted to coöperate therewith and capable of a limited rotary movement, means for transmitting movement from the slidable clutch member to the brake-shoe, a collar engaging the slidable clutch member, a link pivoted at one end to the collar, a rocker to which the other end of the link is eccentrically connected and a pair of pull-rods connected to the rocker at diametrically opposite points equidistant from the point of connection with the rocker, substantially as described.

JAKE KNUTH.
CHARLES READ.

Witnesses:
W. H. KNUTH,
JOHN C. MURPHY.